(12) United States Patent
Chambers et al.

(10) Patent No.: US 6,820,090 B2
(45) Date of Patent: Nov. 16, 2004

(54) METHOD FOR GENERATING QUANTILES FROM DATA STREAMS

(75) Inventors: John M Chambers, Summit, NJ (US); David A James, Morristown, NJ (US); Diane Lambert, Berkeley Heights, NJ (US); Scott Alan Vander Wiel, Fanwood, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 421 days.

(21) Appl. No.: 10/103,922

(22) Filed: Mar. 22, 2002

(65) Prior Publication Data

US 2003/0182293 A1 Sep. 25, 2003

(51) Int. Cl.[7] .............................................. G06F 17/30
(52) U.S. Cl. ............................. 707/101; 707/6; 707/7; 707/3; 707/4; 707/100; 707/1
(58) Field of Search .............................. 707/1, 3, 4, 6, 707/7, 100, 101, 102

(56) References Cited

U.S. PATENT DOCUMENTS

| | | | | |
|---|---|---|---|---|
| 5,870,752 A | | 2/1999 | Gibbons et al. ............. | 707/102 |
| 5,991,332 A | * | 11/1999 | Lomp et al. ................. | 375/152 |
| 6,108,658 A | | 8/2000 | Lindsay et al. ............. | 707/101 |
| 6,229,843 B1 | * | 5/2001 | Lomp et al. ................. | 375/150 |
| 6,272,168 B1 | * | 8/2001 | Lomp et al. ................. | 375/222 |

OTHER PUBLICATIONS

Donald L, Iglehart "Simulating stable Stochastic system, VI: Quantile Estimation", ACM, vol. 23, No. 2, pp. 347–360, Apr. 1976.*

Athanassios N. Avramidis, "Variance Reduction for quantile estimation via correlation induction", ACM, pp. 572–576.*
Chen et al., "Simulation based estimation of quantiles", ACM, pp. 428–434.*
Avramidis et al., "Correlation–induction techniques for estimating quantiles in Simulation experiments", ACM, pp–268–277.*
Au–Yeung et al., "Efficient apprximation of response time densities and quantiles in stochastic models", ACM, pp. 151–155.*
Trong Wu, "An Accurate computation of the hypergeometric distribution function", ACM, vol. 19, No. 1, Mar. 1993, pp. 33–43.*
Ding et al., "Statiscal estimation of the cumulative distribution function for power dissipation in VLSI circuits", ACM, pp. 1–6.*
F. Chen, D. Lambert, J.C. Pinheiro, "Incremental Quantile Estimation For Massive Tracking", Proceedings of the ACM–KDD 2000 Conference, pp. 516–522, 2000.

* cited by examiner

Primary Examiner—Jean M. Corrielus
(74) Attorney, Agent, or Firm—Martin I. Finston (57) ABSTRACT

In a method for acquiring statistical information from data, an initial cumulative distribution function (CDF) that characterizes an initial set of data is acquired. The acquisition of this CDF comprises acquiring a set of quantile endpoints that define the CDF. At least one additional CDF, which characterizes a further set of data, is also acquired. Information that describes the initial CDF is combined with information that describes one or more additional CDFs, and the result is used to obtain a composite CDF that describes a combined set of data that includes the initial data set and the one or more further data sets. Then, a new set of quantile endpoints is determined, that defines the composite CDF. The sequence of steps described above is repeated at least once more. The previously obtained composite CDF is used as the initial CDF for each repetition of this sequence.

12 Claims, 7 Drawing Sheets

AGENT RECORD

AGENT RECORD

METHOD FOR GENERATING QUANTILES FROM DATA STREAMS

FIELD OF THE INVENTION

This invention relates to methods for deriving statistical information from a stream of data, and for updating that information.

ART BACKGROUND

There are many practical problems of data collection in which it is useful to summarize large volumes of data in a fast and reliable manner, while preserving as much information as possible. One class of problems of that kind relates to the collection of data that reflect the performance of a communication network. One example from that class of problems is the problem of collecting and summarizing the length of time to complete each of a sequence of transactions that take place on a network. In the case, e.g., of e-mail transaction times, the problem is made more difficult by the fact that the data arrive in small increments at random times, and because it is often desirable to reserve for processing and storing the data an amount of memory that is small relative to the volume of data to be processed.

Those of skill in the art have long been acquainted with the histogram as a means for summarizing statistical data. To create a histogram, the practitioner marks off endpoints along an axis that corresponds to the incoming data; i.e., to the measured values of the statistic that is to be characterized. Below, we will refer to the incoming measured values as scores, and to the corresponding axis as the data axis. Accordingly, the endpoints referred to above are marked off along the score axis. Each pair of successive endpoints defines an interval. The height of the histogram within each interval, measured along a probability axis perpendicular to the data axis, is proportional to the number of scores that fall within that interval. Below, we will find it convenient to refer to each such interval as a bucket.

When a histogram is based on an exhaustive set of data, it can dependably represent the statistical distribution of those data. However, if the histogram is based on only a partial set of data, it might not dependably represent the full population from which that partial set was taken. In particular, a histogram based on an initial portion of a stream of data might differ substantially from a histogram based on a longer initial portion or on a subsequent portion of the data stream.

When a stream of data arrives over time, it is often most convenient to characterize the arriving data by taking an initial sequence of data values, creating a histogram, and then updating the histogram using further data values taken from subsequently arriving data. Such a procedure is especially useful when the amount of computer memory available for processing and storing the data is limited.

The quality of a histogram depends on its ability to model the population of data that it is based on, and on its ability to preserve statistical information about that population. In both of these aspects, the quality of a histogram is affected by the setting of the endpoints that define the respective buckets, and also by the procedure used to update the histogram using later-arriving data.

In the statistical study of network performance, among other fields, there has been a recognized need for methods of processing data streams to characterize the data more reliably without sacrificing useful statistical information.

SUMMARY OF THE INVENTION

We have invented an improved method for acquiring statistical information from data, which may, e.g., be already accumulated data or data that are arriving as a data stream. According to the inventive method, an initial cumulative distribution function (CDF) that characterizes an initial set of data is acquired. The acquisition of this CDF comprises acquiring a set of quantile endpoints that define the CDF. The quantile endpoints are endpoints that could be marked off along the data axis in such a way that a defined fraction of the sampled scores would lie within each corresponding bucket.

At least one additional CDF, which characterizes a further set of data, is also acquired. Information that describes the initial CDF is combined with information that describes one or more additional CDFs, and the result is used to obtain a composite CDF that describes a combined set of data that includes the initial data set and the one or more further data sets. Then, a new set of quantile endpoints is determined, that defines the composite CDF. The sequence of steps described above is repeated at least once more. The previously obtained composite CDF is used as the initial CDF for each repetition of this sequence.

BRIEF DESCRIPTION OF THE DRAWING

FIG. 3 is presented here for pedagogical purposes.

FIG. 4 is presented here to illustrate the potential complexity of statistical data that have practical significance in fields such as communications.

DETAILED DESCRIPTION

Figure 1:
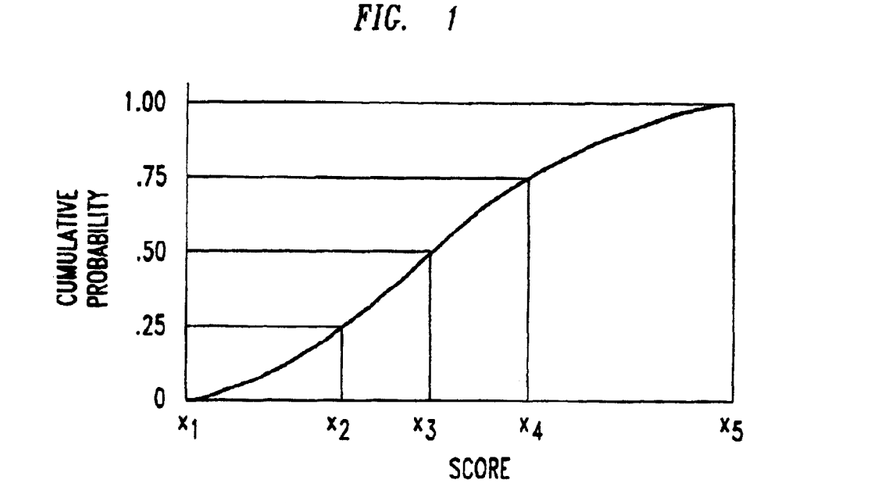
FIG. 1 is an example of a typical cumulative distribution function, presented here for pedagogical purposes.
Figure 2:
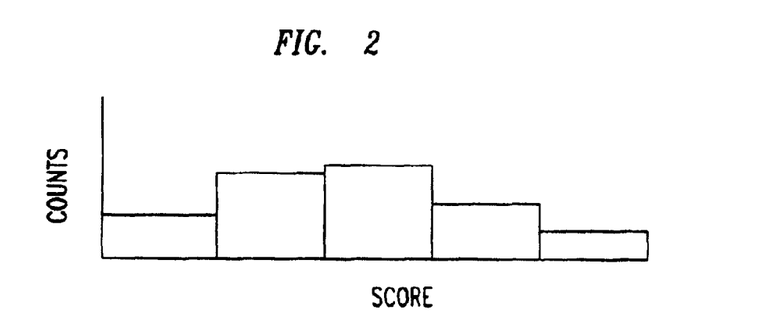
FIG. 2 is an example of a typical histogram, presented here for pedagogical purposes.

FIGS. 1 and 2 are, respectively, a cumulative distribution function (CDF) and a histogram representing a set of data having a roughly bell-shaped distribution. The histogram of FIG. 2 is the most common type of histogram, in which the buckets are all of equal width, and the bucket endpoints are fixed.

Figure 3:
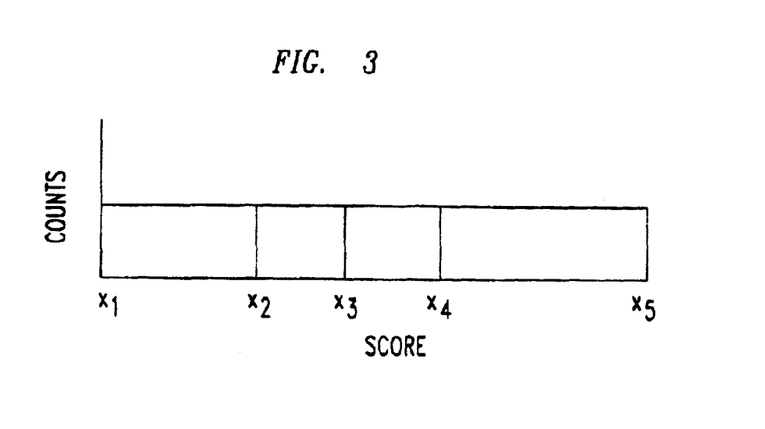
FIG. 3 is an example of a histogram produced by a procedure alternative to that which produced the histogram of FIG. 2.

FIG. 3 illustrates an alternative procedure for creating a histogram, in which the bucket endpoints are not fixed, but instead are adjusted in accordance with the data being characterized. Each bucket endpoint in the histogram of FIG. 3 corresponds to a defined quantile level on the CDF of FIG. 1. Thus, in the example illustrated by FIG. 3, the intervals are chosen corresponding to quantiles spaced by 0.25. The procedure chooses $x_2$ so that 25% of the scores are less than $x_2$. Similarly, $x_3$ is chosen so that 25% of the scores are between $x_2$ and $x_3$, and $x_4$ is chosen so that 25% of the scores are between $x_3$ and $x_4$. The values $x_1$ and $x_5$ are chosen so that all the scores are greater than $x_1$ and no scores are greater than $x_5$. It will be clear that as the data are accumulated, the endpoints will shift along the data axis in order to keep the appropriate fraction of all the data within each respective bucket.

It should be noted that in practice, the ratio of the number of scores in each interval to the total number of scores might not be precisely equal across all intervals. However, it will suffice, in general, to choose the intervals in such a way that shifting any one of them will shift at least one such ratio farther from the chosen value.

If the defined quantile levels are equally spaced along the probability axis, the resulting filled buckets will all be of equal probability, because each interval between quantiles will represent an equal fraction of all of the accumulated data. That is the case illustrated in FIG. 3. It should be noted, however, that in practice there are often good reasons to space the defined quantile levels unequally along the probability axis. In such cases, the buckets will not all be of equal probability.

Figure 4:
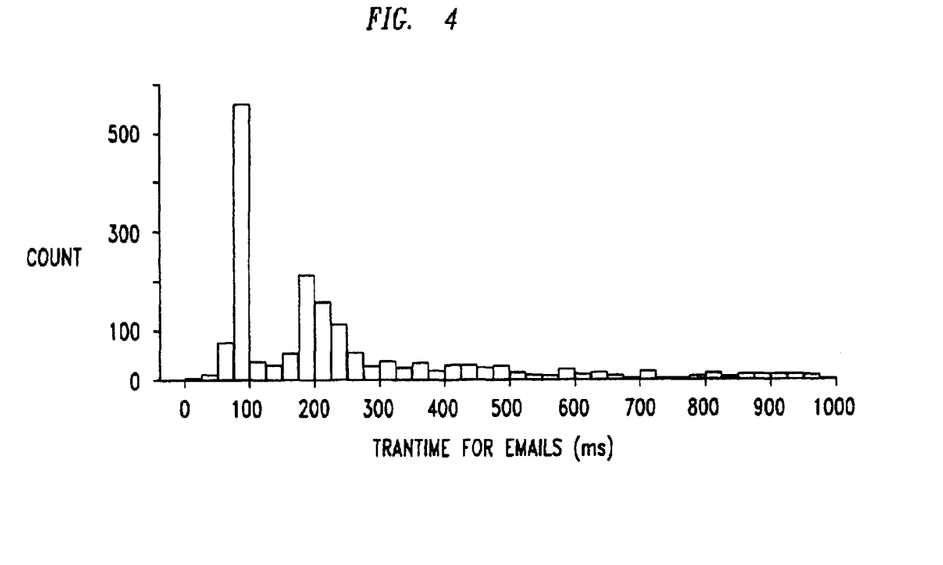
FIG. 4 is a histogram of an actual set of e-mail transaction times.

FIG. 4 is a histogram of a set of e-mail transaction times that we acquired from a network. It will be clear that the data represented in FIG. 4 have a complicated distribution, including multiple peaks, a short left tail that ends at 1 ms, and a right tail extending from about 300 ms to times beyond 900 ms. In fact, the data from which the histogram of FIG. 4 was generated, which consisted of 1779 measured transaction times, included scores extending out to 34,000 ms. Thus, the right tail is extremely long, and only a small portion of it is shown in the figure.

We have found that for characterizing data such as those of FIG. 4, a quantile-based histogram is preferable to a fixed-length histogram, because the quantile-based histogram generally preserves more information about the distribution of data. For that reason, among others, the method that we are about to describe is based on the use of quantile endpoints to partition the data—i.e., the raw scores—into buckets.

Figure 5:
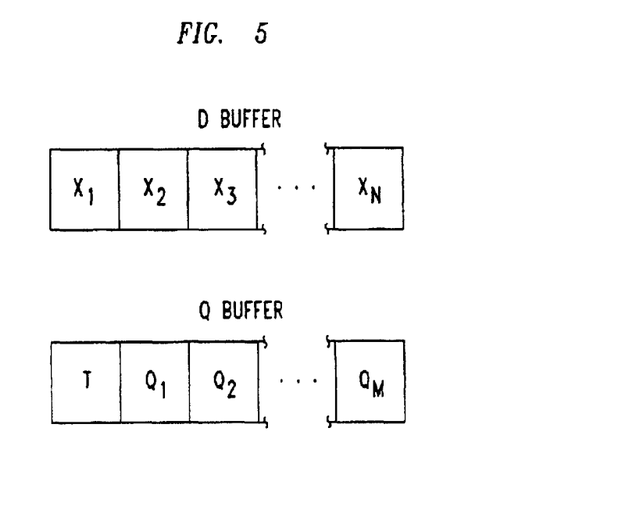
FIG. 5 is a symbolic representation of a pair of buffers useful for practicing the invention in an exemplary embodiment.

FIG. 5 is a symbolic representation of a pair of buffers useful for practicing the invention in an exemplary embodiment. The buffer denoted the "D Buffer" in the figure holds, at a given time, N scores $X_1, \ldots, X_N$ sampled from the incoming data stream. The buffer denoted the "Q Buffer" holds, at a given time, M values $Q_1, \ldots, Q_M$, each of which is an endpoint value for a respective, defined quantile. Generally, $Q_1$ is the endpoint for the 0.00 quantile level, and $Q_M$ is the endpoint for the 1.00 level. The Q Buffer also contains the positive integer T, which represents the total number of scores that have entered into the computation of the present values of $Q_1, \ldots, Q_M$. As will be described in detail below, the scores temporarily stored in the D Buffer will be used to update the endpoint values in the Q Buffer. The D Buffer will then be cleared and filled with a new sample of data, and the process will repeat. On the initial application of the method with a new data stream, T is zero. This has the effect that only the data in the D Buffer is used.

Figure 6:
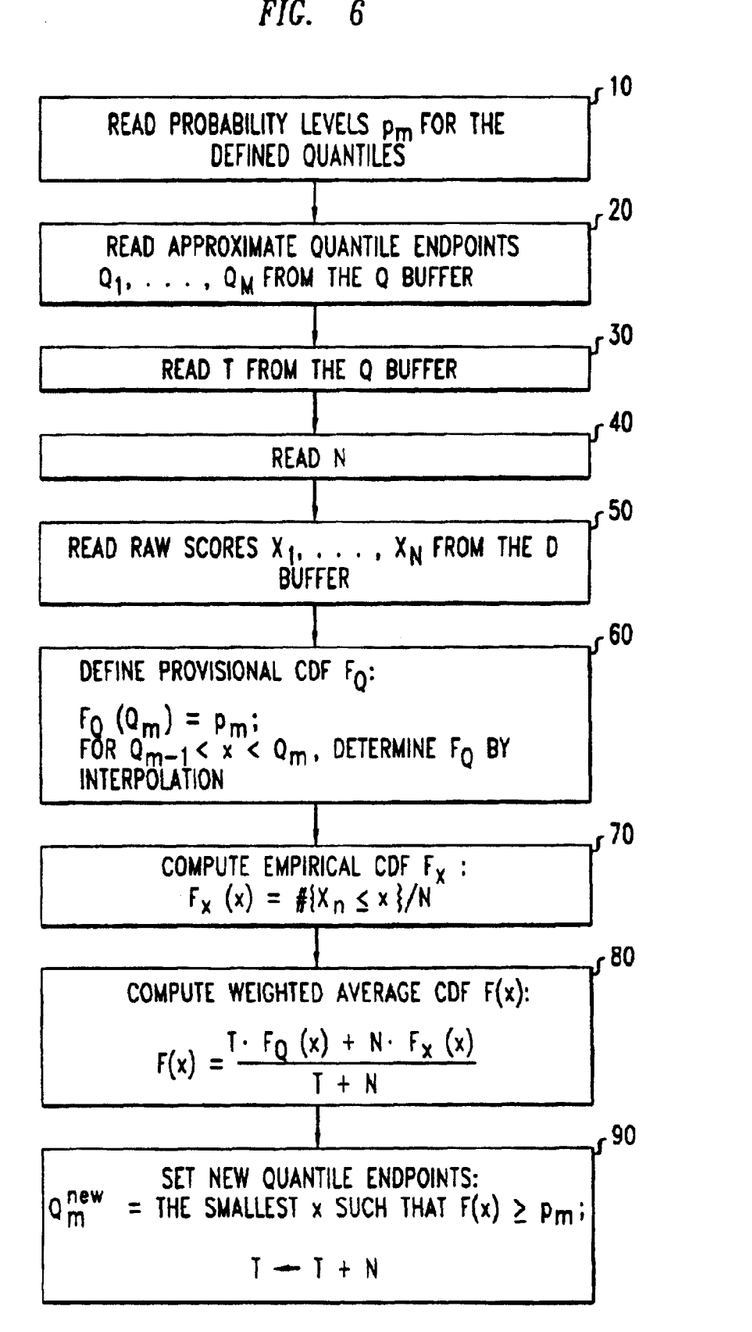
FIG. 6 is a flowchart of the invention in an illustrative embodiment.

FIG. 6 is a flowchart of our method, in an exemplary embodiment. The object of the procedure represented in FIG. 6 is to update a set of endpoint values stored in the Q Buffer. As noted above, each endpoint value corresponds to a probability level, here denoted $p_m$, for one of the M desired quantiles. At block 10, the probability levels $p_m$, m=1, . . . , M, for the defined quantiles are read. At block 20, the corresponding endpoints $Q_1, \ldots, Q_M$ are read from the Q Buffer. We refer to these values as approximate quantile endpoints, because they are based on an initial portion of the incoming data stream, and are to be updated. At block 30, the weight T is read from the Q Buffer. T is the total number of scores that have been taken into consideration in computing the endpoint values currently stored in the Q Buffer.

At block 40, the total number N of scores currently stored in the D Buffer is read. At block 50, the raw scores $X_1, \ldots, X_N$ are read from the D Buffer.

At block 60, a function $F_Q(x)$, referred to here as the "provisional CDF," is defined. The variable x runs along the data axis. $F_Q(x)$ is defined with reference to the probability levels $p_m$ and the endpoints $Q_m$ according to the following rules:

For $x=Q_m$, m=1, . . . , M, $F_Q(x)=p_m$.

For intermediate values of x, i.e., for values of x between $Q_{m-1}$ and $Q_m$, the value of $F_Q(x)$ is determined by interpolating between the value at $Q_{m-1}$ and the value at $Q_m$.

Figure 7:
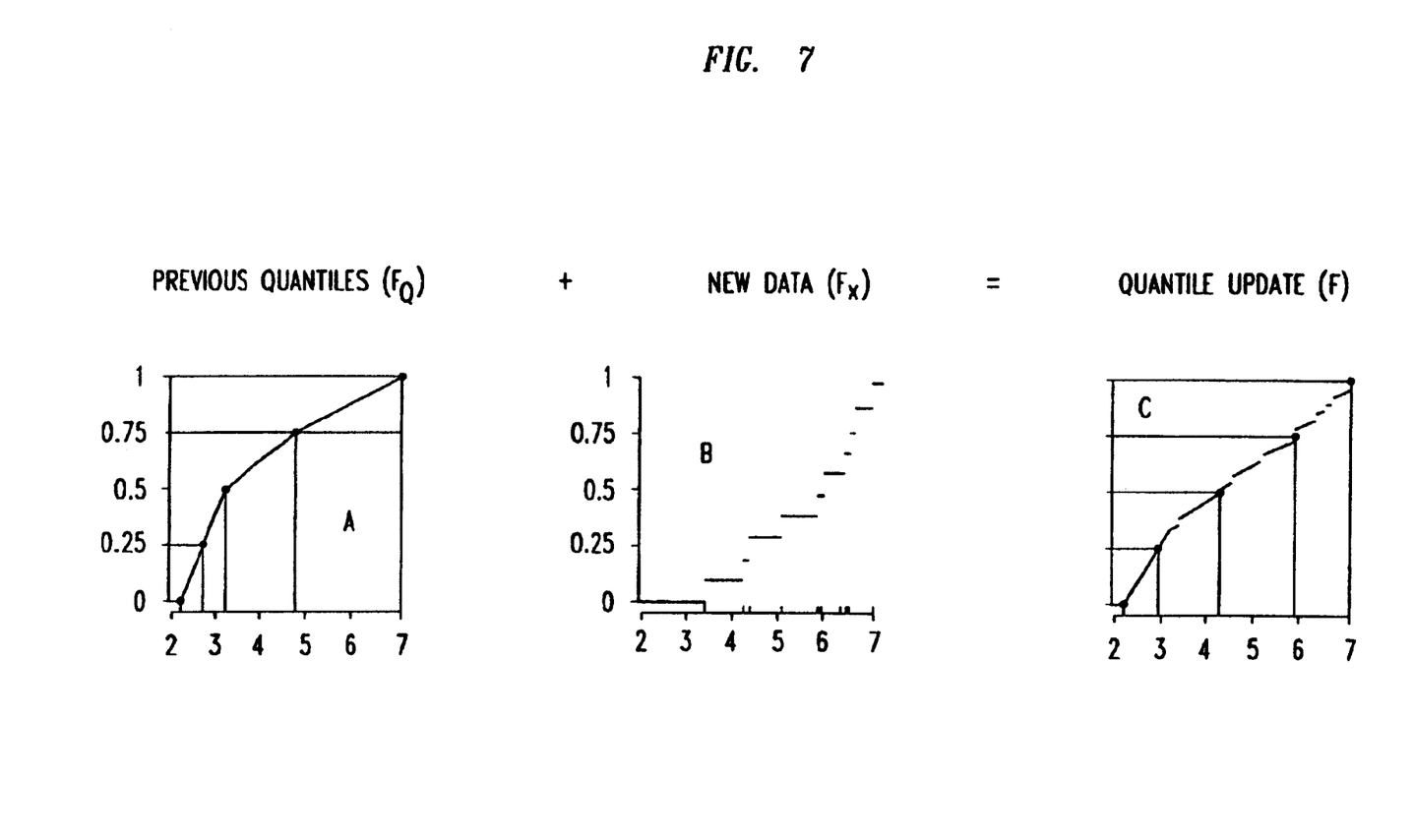
FIG. 7 illustrates exemplary procedures, useful for practicing the invention in some embodiments, for constructing a provisional cumulative distribution function (CDF) by linear interpolation, construting an empirical CDF, and averaging the provisional and empirical CDFs to form a composite CDF.

FIG. 7 includes an example A of a provisional CDF constructed by linear interpolation between the endpoints $Q_m$ It should be noted that in at least some cases, especially when the distribution of data has a long right tail, accuracy will be improved by using nonlinear interpolation instead of linear interpolation. By way of example, we have advantageously applied to the probability scale p the following nonlinear transformation g(p) prior to interpolation:

$$g(p) = \begin{cases} \log(p/(1-p)), \text{ if } p > 0.5 \\ p - 0.5, \text{ if } p \le 0.5 \end{cases}$$

$$g^{-1}(x) = \begin{cases} (1+\exp(-x))^{-1}, \text{ if } x > 0 \\ \max(0, x+5), \text{ if } x \le 0 \end{cases}.$$

The expression "max(0, x+5) in the preceding formula is present because it is assumed that $g^{-1}(x)$ is defined for all real x. Interpolation is then done linearly with respect to $g(p_m)$ At block 70, a function $F_x(x)$ is computed from the raw scores in the D Buffer. The function $F_x(x)$ approximates the statistical distribution of the data from the data stream during the period between the previous update and the present update. In the absence of other information, $F_x(x)$ will be computed as the empirical cumulative distribution according to well-known statistical procedures. However, it should be noted that our method is also advantageously practiced using alternative methods for estimating $F_x(x)$. For example, the estimate of $F_x(x)$ could be based on knowledge of the changing nature of the data stream. Such knowledge can be incorporated, for example, when $F_x(x)$ is estimated as a parametric distribution described by a set of updateable parameters.

In the illustrative embodiment described here, $F_x(x)$ is the empirical cumulative distribution. Accordingly, in the following discussion, $F_x(x)$ will be referred to for convenience as the "empirical CDF." However, the use of that term does not limit the scope of the possible alternative forms and definitions that $F_x(x)$ might take.

$F_x(x)$ is defined, for a given x, as the total number of scores $X_n$ that are less than or equal to x. An example B of an empirical CDF $F_x(x)$ is included in FIG. 7. It will be apparent from FIG. 7 that $F_x(x)$ is typically a piecewise constant function, with the endpoints of each constant piece defined by successive, distinct scores $X_n$.

At block 80, a further CDF, denoted $F(x)$, is computed as a weighted average of the provisional CDF and the empirical CDF. The weight given to the provisional CDF is proportional to T, and the weight given to the empirical CDF is proportional to N. That is, $F(x)$ is defined by:

$$F(x) = \frac{T \cdot F_Q(x) + N \cdot F_x(x)}{T + N}.$$

The above averaging procedure is illustrated in FIG. 7. FIG. 7 includes an example C of a CDF obtained by taking the weighted average of provisional CDF A and empirical CDF B.

At block 90, the Q buffer is updated with new quantile endpoints, and T is incremented by N to reflect the fact that N more scores have entered into the computation of the current set of quantile endpoints. The new quantile endpoints are computed from the weighted average CDF $F(x)$ according to the following rule:

$Q_m^{new}$=the smallest $x$ such that $F(x) \geq p_m$.

It will be appreciated that the method described above processes incoming data block-by-block, where each block is one filling of the D Buffer. Such a method is not limited to the processing of a single stream of data that arrive sequentially in time. On the contrary, methods of the kind described above are readily adaptable for, e.g., merging short-term data records, such as daily records, into longer-term records, such as weekly records. Methods of the kind described above are also readily adaptable for merging records acquired by a collection of independent agents into a single, master record. The agents need not have operated sequentially, but instead, e.g., may have carried out concurrent data acquisition.

Figure 8:
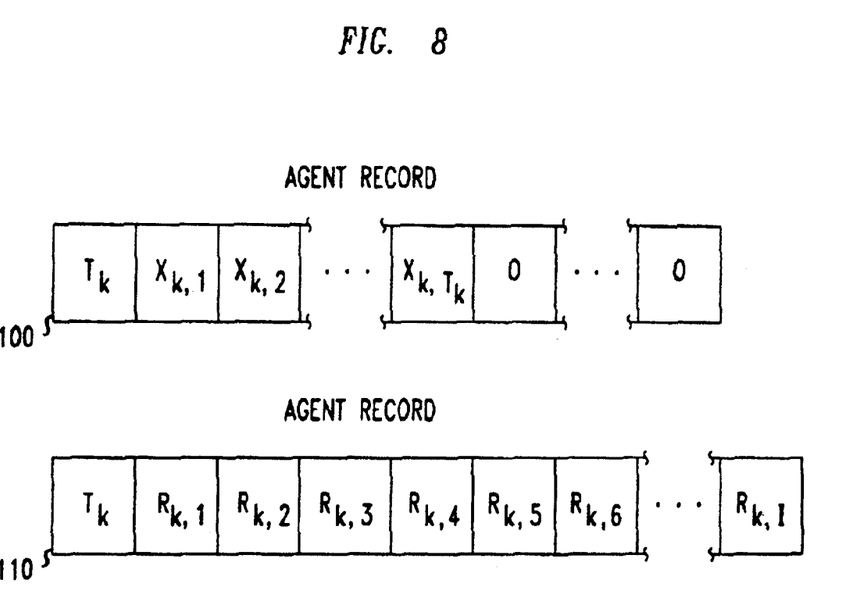
FIG. 8 is a symbolic representation of a pair of agent records useful for practicing the invention in certain embodiments, including the embodiment of FIG. 9.

According to one possible scenario, each of a collection of K agents acquires data, and sends the data to a central location in a record of length I+1. Two examples of agent records are provided in FIG. 8. Agent record 100 contains $T_k$ scores, where $T_k \leq I$, and the record also contains the weight $T_k$. Where record 100 is the k'th of K records, the scores that it contains are denoted $X_{k,1}, \ldots, X_{k,T_k}$. Agent record 110 is used when the agent has already computed a provisional CDF as described above, and from the provisional CDF together with a set of defined quantile probability levels has computed quantile endpoints $R_{k,1}, \ldots, R_{k,I}$. In that case, agent record 110 contains the I computed endpoints, and also contains the weight $T_k$, which is now the total number of scores taken into consideration in computing the current set of quantile endpoints $R_{k,i}$, i=1, ..., I.

Whether the agent sends a record of the type 100 or the type 110 will typically depend on the volume of data being processed by the agent. If in a particular iteration the agent is required to process more scores than can fit on its D Buffer, or if the agent's Q Buffer is already full, the agent will typically update the Q Buffer as described above in connection with FIG. 6, and will send a record of the type 110. Otherwise, the agent will send a record of the type 100.

Figure 9:
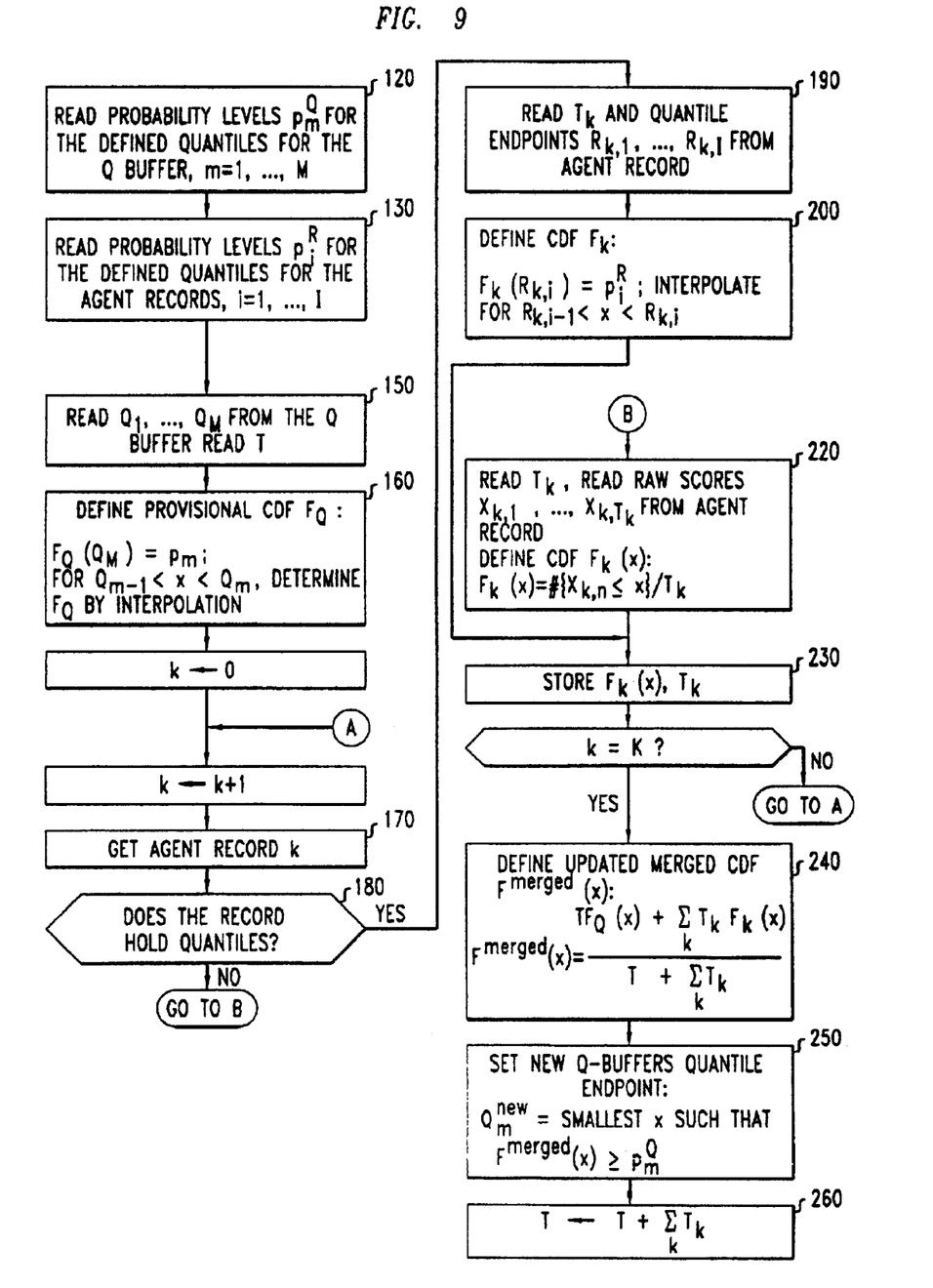
FIG. 9 is a flowchart of a method for merging agent records, according to the invention in a further illustrative embodiment.

FIG. 9 is a flowchart of a method for merging agent records, according to the invention in another exemplary embodiment. We first note that three different sets of quantiles, may be defined: one set for the Q Buffer at the central processing location, one set for the agent records, and one set for the output record that represents the merged data. Accordingly, at block 120 of FIG. 9, a set of quantile probability levels is read for use in the Q Buffer at the central processing location. This set consists of M quantile probability levels $p_m^Q$, m=1, ..., M. At block 130, a set of quantile probability levels is read for use in the agent records. This set consists of I probability levels $p_i^R$, i=1, ..., I.

The generation of an output record is discussed below in connection with FIG. 10. At block 300 of FIG. 10, as will be seen, a set of quantile probability levels is read for use in the output record that characterizes the merged data. This set consists of J probability levels $p_j^s$, j=1, ..., J.

At block 150, the current approximate quantile endpoints $Q_1, \ldots, Q_M$ are read from the Q Buffer at the central processing location. As noted above, T is zero in the initial application of the method. As a consequence, the contents of the Q Buffer are not used.

At block 160, the approximate quantile endpoints are used to define a provisional CDF $F_Q(x)$ as explained above in connection with FIG. 6. As indicated at block 170, agent record k is now obtained. If this is the first iteration, then record k is the first agent record; otherwise, it is the next agent record in sequence. As indicated at block 180, the treatment of agent record k depends on whether or not the record holds quantiles; i.e., on whether it is a record of the type 110 or a record of the type 100. If the record contains quantiles, control passes to block 190, to be described below. Otherwise, control passes to block 220, to be described below.

If control has passed to block 190, agent record k contains quantiles. Accordingly, at block 190, the quantile endpoints $R_{k,1}, \ldots, R_{k,i}$ are read from the agent record. The weight $T_k$, indicative of the total number of scores taken into consideration in computing the quantile endpoints, is also read.

At block 200, a provisional CDF $F_k(x)$ is defined using the quantile endpoints from agent record k and the probability levels $p_i^R$ for the agent records. That is, for $x=R_{k,i}$, $F_k(x)=p_i^R$. For values of x that fall between the endpoints $R_{k,i}$, interpolation is used as described above. At block 230, a representation of the resulting provisional CDF $F_k(x)$ is stored, together with the weight $T_k$.

If control has passed to block 220, agent record k does not contain quantiles, but instead contains raw scores $X_{k,1}, \ldots, X_{k,T_k}$. At block 220, these raw scores are read from the agent record into the D Buffer at the central processing location, and $T_k$ is read. Additionally, the CDF $F_k(x)$ is constructed at block 220, as an empirical CDF, from the raw scores that have been read into the D Buffer at the central processing location. In FIG. 9, these scores are denoted $X_1, \ldots, X_N$. The construction of an empirical CDF is as described earlier with reference to FIG. 6.

At block 220, the raw scores from any number of individual agent records are optionally pooled and treated as a single data set, with $T_k$ adjusted to reflect the total weight of the pooled scores.

As noted above, the term "empirical CDF" has been adopted for convenience, and should not be understood as limiting the possible forms that the agent CDF might take. Instead, like the method described with reference to FIG. 6, the method described here remains valid if $F_k(x)$ is chosen as any appropriate estimate for the distribution of the incoming data. The empirical CDF, in the strict sense of that term, is the typical choice in the absence of other information.

At block 230, $T_k$ and the CDF $F_k(x)$ are stored at the central processing location.

If the current agent record is not the last agent record, control now returns to block 170 for a further iteration. Otherwise, control passes to block 240.

At block 240, a new CDF, denoted $F^{merged}(x)$ in FIG. 9, is exemplarily constructed by computing a weighted average of: the provisional CDF $F_Q(x)$ related to the Q Buffer at the central processing location, and each of the provisional or empirical CDFs $F_k(x)$ related to the respective agent records. Specifically, $F^{merged}(x)$ is defined by:

$$F^{merged}(x) = \frac{TF_Q(x) + \sum_k T_k F_k(x)}{T + \sum_k T_k}.$$

The summations in the preceding expression are carried out over all agent records.

It will be appreciated that the preceding formula for the merged CDF gives equal weight to each score. This formula is readily generalized by permitting each of the agent weights $T_k$ to be freely adjustable. For example, setting each of the agent weights to unity results in a merged CDF in which each agent, rather than each score, has equal weight.

It should be noted that arithmetic averaging is only one of various methods for updating a merged CDF, all of which lie within the scope of the present invention. For example, the merged CDF may be defined by a set of parameters, and the updating of the merged CDF may be performed by updating the parameters so that they reflect knowledge both of the previous merged CDF and of the agent records.

At block 250, new quantile endpoints $Q_m^{new}$ are computed for storage in the Q Buffer at the central processing location according to:

$$Q_m^{new} = \text{the smallest } x \text{ such that } F^{merged}(x) \geq p_m^Q.$$

At block 260, the weight factor T is updated by adding to it the total of all agent weight factors $T_k$. That is, $$T \leftarrow T + \sum_k T_k.$$

Output records may be produced at any time, using the current CDF $F^{merged}(X)$. As noted above, a set of quantile probability levels is read at block 300 of FIG. 10 for use in the output record that characterizes the merged data. This set consists of J probability levels $p_j^S$, $j=1, \ldots, J$.

Figure 10:
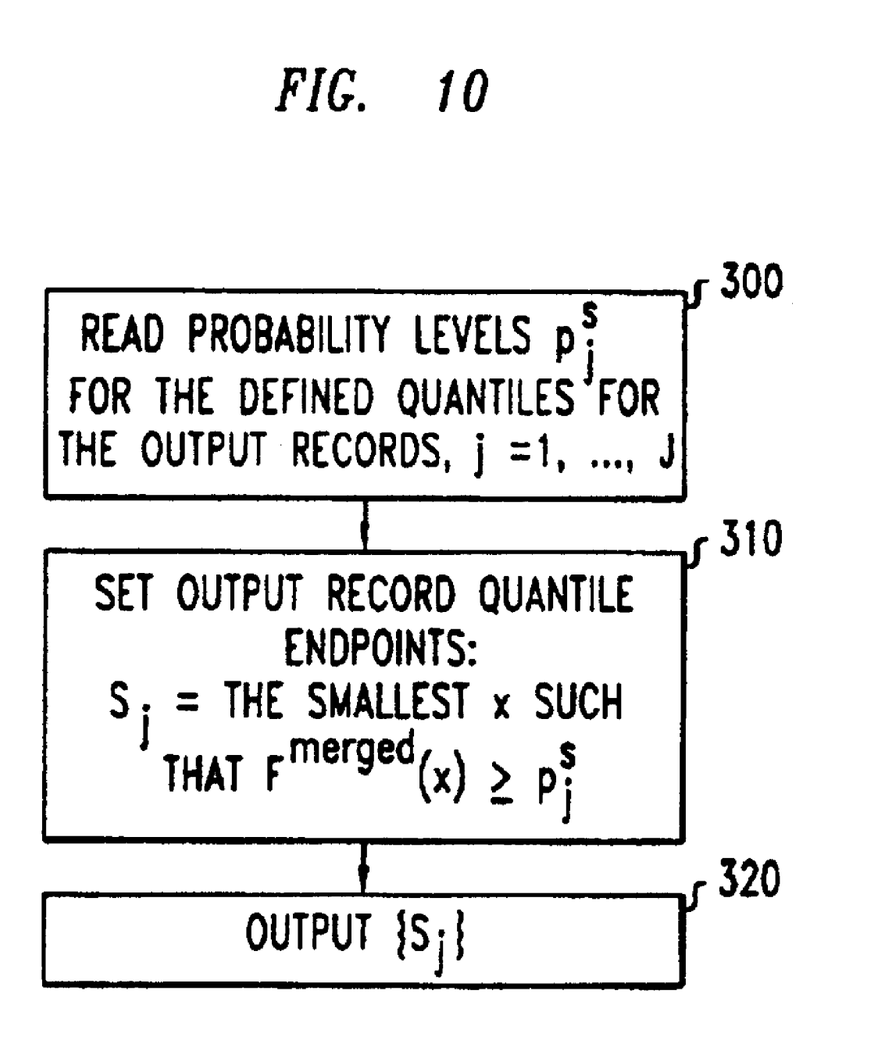
FIG. 10 is a flowchart illustrating a procedure for generating output records. The illustrated procedure is useful in the practice of the invention in some embodiments, including the embodiment of FIG. 9.

At block 310 of FIG. 10, the output record is prepared by setting new quantile endpoints $S_j$, $j=1, \ldots, J$. These endpoints, denoted "output record quantile endpoints" in FIG. 10, are prepared from the CDF $F^{merged}(x)$ and from the probability levels $p_j^S$ that were read in block 300. Specifically, the endpoints $S_j$ are defined by:

$$S_j = \text{the smallest } x \text{ such that } F^{merged}(x) \geq p_j^S, j=1, \ldots, J.$$

It should be noted that when merging, e.g., hourly records into daily records. it is convenient to start the Q Buffer and the D Buffer at the beginning of each new hourly period. However, there are at least some circumstances, e.g. in the analysis of network performance data, when data from one reporting period (such as an hourly period) are relevant to performance in the next reporting period. Under such circumstances, it may be advantageous to start the Q Buffer, at the beginning of the next, e.g., hour, in its final state from the previous hour, but with a scaled-down weight factor.

What is claimed is:

1. A method, comprising:
    a) acquiring an initial cumulative distribution function (CDF) that characterizes an initial set of data;
    b) acquiring at least one additional CDF that characterizes a further set of data; and
    c) combining information that describes the initial CDF with information that describes at least one said additional CDF, thereby to obtain a composite CDF that describes a combined set of data that includes the initial data set and at least one said additional data set;
    characterized in that step (a) comprises acquiring a set of quantile endpoints that define the initial CDF, and the method further comprises:
    d) determining a set of quantile endpoints that define the composite CDF; and
    e) repeating steps (a)–(d) at least once more, wherein each repetition of step (a) takes as the initial CDF the composite CDF obtained in the most recent execution of step (c).

2. The method of claim 1, wherein (a) comprises constructing the initial CDF from a stored set of quantile endpoints and from probability levels associated with said endpoints.

3. The method of claim 2, wherein (c) comprises computing an arithmetic average of the initial CDF with the at least one additional CDF.

4. The method of claim 1, wherein (b) comprises computing an empirical CDF, denoted $F_x(x)$, for at least one of the additional data sets, wherein for each possible value of its argument x, $F_x(x)$ expresses the number of data points in the pertinent data set whose values are at most x.

5. The method of claim 1, further comprising at least one step of outputting a set of quantile endpoints that describe the current composite CDF.

6. The method of claim 1, wherein:
    (b) comprises receiving at least two agent records, each of which contains or represents a set of data, and computing one or more CDFs that collectively characterize the received agent records; and
    (c) is carried out so as to obtain a composite CDF that describes a combined set of data that includes the initial data set together with the data set contained in or represented by each agent record.

7. The method of claim 6, wherein (c) comprises arithmetic averaging of the initial CDF with the one or more CDFs that characterize the agent records.

8. The method of claim 6, wherein (b) comprises computing a respective CDF that individually characterizes each received agent record.

9. The method of claim 8, wherein (b) comprises, for each received agent record that contains a set of raw data, computing an empirical CDF, denoted $F_x(x)$, wherein for each possible value of its argument x, $F_x(x)$ expresses the number of data points in the pertinent data set whose values are at most x.

10. The method of claim 6, wherein (b) comprises receiving two or more agent records that contain sets of data and computing a CDF that represents a pooled set of data from said two or more agent records.

11. The method of claim 10, wherein the step of computing a CDF that represents a pooled set of data comprises computing an empirical CDF, denoted $F_x(x)$, wherein for each possible value of its argument x, $F_x(x)$ expresses the number of data points in the pooled data set whose values are at most x.

12. The method of claim 6, wherein (b) comprises, for each received agent record that contains quantile endpoints, constructing an agent CDF from the pertinent quantile endpoints and from probability levels associated with said endpoints.

* * * * *